(12) United States Patent
Sun et al.

(10) Patent No.: US 11,544,607 B2
(45) Date of Patent: Jan. 3, 2023

(54) DUAL FLOW GENERATIVE COMPUTER ARCHITECTURE

(71) Applicant: Wisconsin Alumni Research Foundation, Madison, WI (US)

(72) Inventors: Haoliang Sun, Madison, WI (US); Ronak R. Mehta, Madison, WI (US); Hao Zhou, Madison, WI (US); Vikas Singh, Madison, WI (US); Vivek Prabhakaran, Fitchburg, WI (US); Stirling C. Johnson, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 898 days.

(21) Appl. No.: 16/417,192

(22) Filed: May 20, 2019

(65) Prior Publication Data

US 2020/0372384 A1   Nov. 26, 2020

(51) Int. Cl.
| | | |
|---|---|---|
| G06N 7/00 | (2006.01) | |
| G06F 17/18 | (2006.01) | |
| G06N 20/20 | (2019.01) | |
| G06N 3/08 | (2006.01) | |
| G06N 3/04 | (2006.01) | |

(52) U.S. Cl.
CPC ............. *G06N 7/005* (2013.01); *G06F 17/18* (2013.01); *G06N 3/0454* (2013.01); *G06N 3/084* (2013.01); *G06N 20/20* (2019.01)

(58) Field of Classification Search
CPC ...... G06N 7/005; G06N 3/0454; G06N 3/084; G06N 20/20; G06F 17/18
See application file for complete search history.

(56) References Cited

U.S. PATENT DOCUMENTS

| | | | |
|---|---|---|---|
| 2017/0356976 A1* | 12/2017 | Shapiro | ................ G06V 20/698 |
| 2019/0122073 A1* | 4/2019 | Ozdemir | .............. A61B 5/7267 |
| 2021/0004677 A1* | 1/2021 | Menick | .................. G06N 20/20 |

OTHER PUBLICATIONS

Ian J. Goodfellow et al.; "Generative Adversarial Nets"; University de Montreal; dated Jun. 10, 2014—(9) pages.
Tong Che et al.; "Mode Regularized Generative Adversarial Networks"; Published as a conference paper at ICLR dated Mar. 2, 2017—(13) pages.
Tianqi Chen et al.; "Training Deep Nets with Sublinear Memory Cost"; University of Washington; Dator Inc.; Massachusetts Institute of Technology; dated Apr. 22, 2016—(12) pages.
Andrew Brock et al.; "Large Scale GAN Training for High Fidelity Natural Image Synthesis"; Published as a conference paper at ICLR dated Feb. 25, 2019—(35) pages.
Martin Arjovsky et al.; "Wasserstein GAN"; Courant Institute of Mathematics Sciences; Facebook AI Research; dated Dec. 6, 2017—(32) pages.

* cited by examiner

*Primary Examiner* — Brandon J Miller
(74) *Attorney, Agent, or Firm* — Boyle Fredrickson, S.C.

(57) ABSTRACT

A machine learning architecture employs two machine learning networks that are joined by a statistical model allowing the imposition of a predetermined statistical model family into a learning process in which the networks translate between and data types. For example, the statistical model may enforce a Gaussian conditional probability between the latent variables in the translation process. In one application, MRI images may be translated into PET images with reduced mode collapse, blurring, or other "averaging" type behaviors.

12 Claims, 2 Drawing Sheets

DUAL FLOW GENERATIVE COMPUTER ARCHITECTURE

STATEMENT REGARDING FEDERALLY SPONSORED RESEARCH OR DEVELOPMENT

This invention was made with government support under AG040396 awarded by the National Institutes of Health and 1252725 awarded by the National Science Foundation. The government has certain rights in the invention.

CROSS REFERENCE TO RELATED APPLICATION

—

BACKGROUND OF THE INVENTION

The present invention relates to computer architectures for machine learning and in particular to an architecture providing an improved latent variable characterization in a machine learning architecture.

Machine learning systems, for example, artificial neural networks, have been applied to a wide variety of image processing tasks including, importantly, problems of classification where images are analyzed to classify their contents, for example, identifying cars and pedestrians for controlling autonomous vehicles, or cancerous lesions for medical diagnosis.

Recent work has investigated the ability of machine learning to generate images (for example, using Generative Adversarial Networks) based on a seed variable or the like. These image generation techniques can be useful in so-called "modality transfer" where a medical image taken by a first imaging modality (for example, magnetic resonance imaging (MRI)) is used as a seed variable in machine learning to generate a comparable image as if acquired with a second imaging modality (for example, CT imaging). Such modality transfer to a second modality can provide novel information that was not apparent in the first modality data. This is in essence 'free' information that otherwise was not apparent in the first modality.

PET (positron emission tomography) imaging offers the possibility of capturing diagnostic information beyond that which can be obtained from other image modalities (e.g. MRI or CT). This additional diagnostic information comes from the introduction of a radioactive tracer (e.g., FDG (fluorodeoxyglucose)) into the patient (e.g., FDG can provide metabolic information of tissue and target and highlight differences in tissue metabolism that might otherwise be indistinguishable). PET imaging can be costly in terms of the equipment, the radioactive tracer, and imaging logistics as well as the needed high levels of skilled technical support. These costs, as well as medical guidelines that recommend limiting patient exposure to the necessary radioactive tracers, serve to limit the availability of PET in many cases clinically as well as in research. Some large-scale medical trials may provide PET images only to a small subset of participants who are otherwise imaged using MRI (magnetic resonance imaging) which, in contrast to PET, is relatively inexpensive and is considered quite safe.

Overall, the ability to get novel information (obtaining data of both modalities using data acquired from one modality), cost savings, limiting patient exposure to radiation, and availability of these different image modalities has motivated investigation into whether MRI images can be translated into clinically significant PET images using machine learning, a process called "modality transfer." While the underlying mechanics of the MRI and PET imaging are radically different—MRIs are obtained using strong magnetic fields, magnetic field gradients, and radio waves to generate images of the organs in the body and do not involve the use of ionizing radiation/radionucleotide, which distinguishes it from PET scans—the hope is that there are some other hidden or unknown linking variables between these image types that would allow this transfer in important diagnostic situations.

Existing modality transfer methods for MRI to PET conversion have made use of CNNs (convolutional neural nets) or GANs (generative adversarial networks). A drawback to the direct use of CNNs for this task is that they may produce blurry output images when compared to results obtained via modality transfer with a generative model such as GANs which attempts to characterize (rather, estimate the parameters of) the probability distribution from which the set of training images are sampled. GANs, on the other hand, produce sharper images but tend to suffer from a problem termed "mode collapse" that produces one of a limited set of output images for a much larger set of input images. GANs may also be computationally difficult to train.

In both cases, the concern is that the machine learning system has essentially trained itself to produce a few "average" or representational PET images, images that would be mathematically close to an image produced by an actual PET scan but at the expense of eliminating small underlying diagnostic differences intended to be revealed.

SUMMARY OF THE INVENTION

The present invention provides a machine learning architecture that appears to overcome the problems of CNNs and GANs with respect to modality transfer and which may have important application in converting MRI images to PET images as well as other similar applications. Generally, the invention provides for two machine learning networks that are joined by a statistical model allowing the imposition of a predefined statistical model family. During training, training information flows inward through each of the networks toward the statistical model and trains the model as well as generates errors for back-propagation training the networks. In one example, the statistical model may be a conditional probability between the output of the networks when they are trained with corresponding MRI and PET images. Through this architecture, the network learning process is constrained by the statistical model in a way that is believed to empirically help prevent mode collapse, blurring, and other "averaging" type behaviors.

Specifically, in one embodiment, the invention provides a computer architecture having: (1) a first machine learning network receiving input data and propagating the input data in a first flow direction through the first machine learning network according to first weight values to produce first output data at a first network interface; (2) a statistical variable converter receiving the first output data and applying it to a statistical model to provide second output data; and (3) a second machine learning network receiving the second output data at a second network interface and propagating the second output data in a first flow direction through the second machine learning network according to second weight values to provide output data.

The first and second weights and the statistical model are trained values produced by: (a) applying training set data to the first machine network to propagate in the first flow direction to the statistical variable converter; and (b) applying corresponding training set data to the second machine network to propagate in a second flow direction opposite the first flow direction to the statistical variable converter. Based on the propagation of the training set data the statistical variable converter: (a) modifies the statistical model; and (b) provides error values for backpropagation to the first machine learning network and second machine learning network based on the current state of the statistical model.

It is thus a feature of at least one embodiment of the invention to provide an improved network architecture for tasks such as modality transfer between image modality types that can steer the training away from results that produce an overly generalized or averaged image.

The statistical variable converter may provide a function of lower dimension than the dimension of the first output data. For example, when the statistical variable converter provides a conditional probability function that conditional probability may be expressed as a set of probability moments for a given distribution type such as Gaussian mean and Gaussian variance.

It is thus a feature of at least one embodiment of the invention to allow control over the dimensionality of the conversion process such as can improve training convergence and reduced computational burden while preserving data relevant to diagnostic distinctions.

In one example, the statistical variable converter may provide conditional probabilities between the first output data and the second output data.

It is thus a feature of at least one embodiment of the invention to allow the imposition of a mathematically well-understood concept of conditional probability into the modality transfer process.

The second output data may be produced from the conditional probability by randomly selecting a value on the conditional probability identified by the first output data according to the weighting of the conditional probability.

It is thus a feature of at least one embodiment of the invention to provide a simple method of incorporating conditional probability into a machine learning network architecture.

The first network may provide a set of branches dividing data passing in the first flow direction in the first machine learning network among the branches to provide a first output for each branch at the first network interface, and the statistical variable converter may provide separate statistical models for each branch in turn providing separate second output data for each branch, and the second network may provide a set of branches combining data in the first flow direction through the second machine learning network to produce the output data combining the separate second output data.

It is thus a feature of at least one embodiment of the invention to provide a hierarchical structure to provide improved processing speed and easier integration of side information (e.g., age, gender) associated with a given MRI image into the modality transfer process.

With respect to this side information, the first machine learning network may include a given statistical variable converter not associated with a branch of the first machine learning network but associated with the branch of the second machine learning network, and the given statistical variable converter may receive side information related to the input data. In this case, the given statistical converter may use a statistical model that is trained by training the first machine learning network and second machine learning network also with respect to side information but isolating side information-based weighting to only a given branch of the first machine learning network associated with the given statistical variable converter.

It is thus a feature of at least one embodiment of the invention to provide for the integration of side information into the modality transfer process while minimizing training the system on the correlated features of the side information and the main data thereby preventing these correlated features from being overemphasized in the modality transfer process.

The process of isolating the side information-based weighting may use side information machine learning networks on branches of the first machine learning network other than the given branch having gradient reversal layers, the side information machine learning networks receiving the side information and operating in parallel with the statistical variable converters during training.

It is thus a feature of at least one embodiment of the invention to provide a method of isolating training of weights in an architecture of this type.

These particular objects and advantages may apply to only some embodiments falling within the claims and thus do not define the scope of the invention.

DETAILED DESCRIPTION OF THE PREFERRED EMBODIMENT

Figure 1:
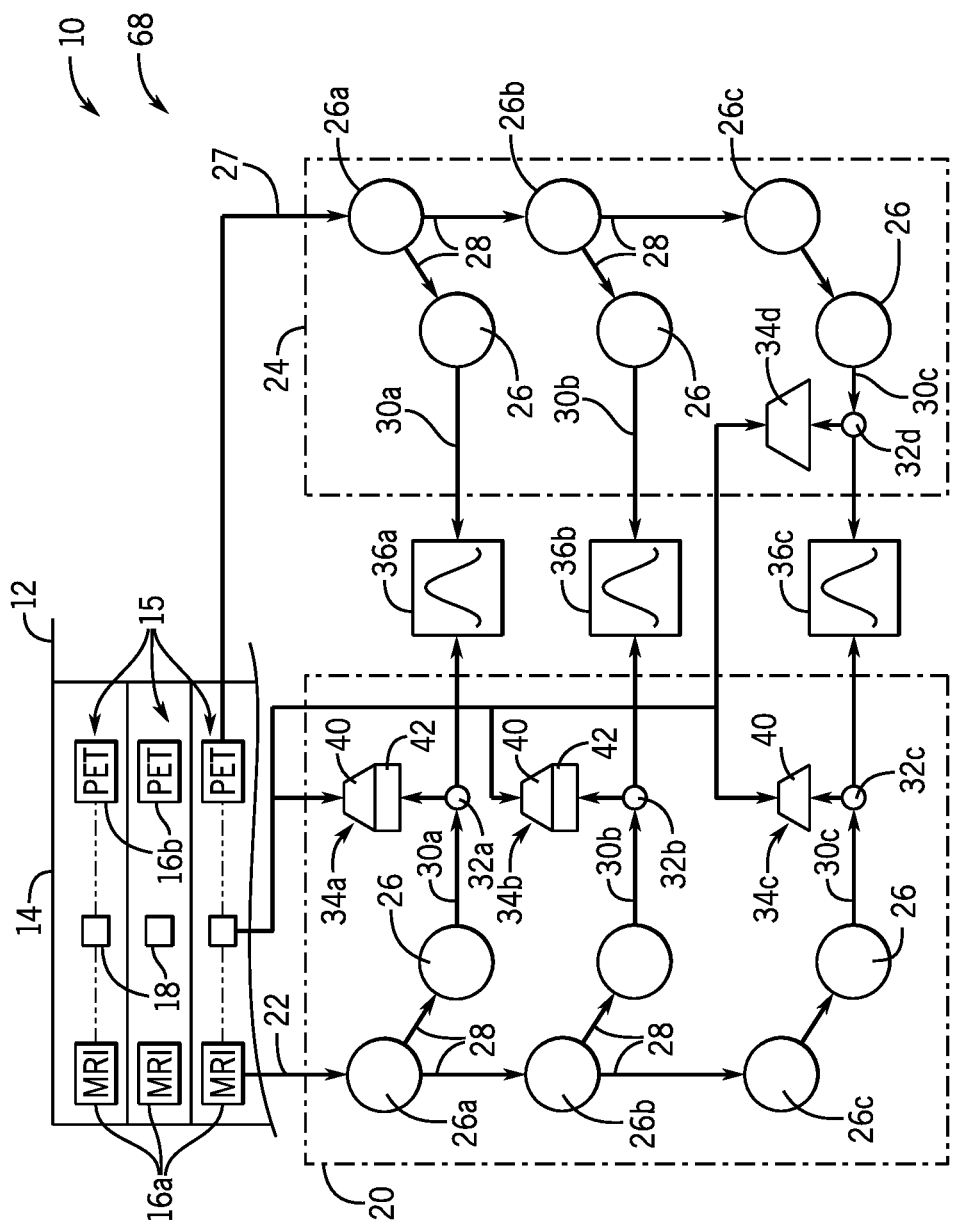
FIG. 1 is a block diagram of the machine learning architecture according to the present invention configured in a training mode using a training set of MRI, PET, and side information data, showing two networks linked by an explicit variable converter, in this case, a conditional probability model and showing the introduction of side information on ancillary networks.

Referring now to FIG. 1, a machine learning network architecture 10 per the present invention may provide a training mode to receive training set data 12 held in a memory 14 for the purpose of training the machine learning network architecture 10. In the example of modality transfer, the training set data 12 may include multiple training elements 15 (indicated diagrammatically by rows) each providing one MRI image 16a linked with respect to a given patient and diagnostic state with corresponding PET images 16b of that same patient. Each element 15 of the training set data 12 may also be associated with side information 18, for example, describing other characteristics of the patient in the diagnostic state of the images 16, such as age, sex, disease status, genotype, etc. Linking this data by the diagnostic state should be understood simply as a requirement that the MRI image 16a, PET image 16b, and side information 18 of a given training element 15 be acquired within an interval in which the patient's medical condition remains substantially unchanged.

The MRI image 16a of each element 15 will be provided to a first network 20 at a network input 22 and the corresponding PET image 16b of that element will be applied to a second network 24 at network input 27.

The networks 20 and 24 may be artificial neural networks having network components 26 of types well known in the art of convolutional network design. These components 26 may, for example, include convolution layers, deconvolution layers, fully connected layers, and the like. Generally, the network 24 must be invertible meaning that it will operate in either of two directions in the processing of data. For simplicity, the networks 20 and 24 may be identical.

The network components 26 of the networks 20 and 24 may be arranged in a hierarchical form such that the outputs of a first network component 26a in each of networks 20 and 24 directly receiving training set data 12 may be separated into different flow paths 28, one passing to branches 30a (via additional network components 26) and the other passing to later network components 26b. This separation process sends different data along each flow path 28, for example, by taking a data vector and sending the first half along one flow path 28 and the second half along a second flow path 28. While simple networks 20 and 24 are shown for clarity, the number of network components 26 and branches 30 may be arbitrarily scaled.

In a similar manner, the output from succeeding network components 26b may be separated into different flow paths 28, one passing to branches 30b (via additional network components 26) and the other passing to later network component 26c.

The output of network components 26 proceeds directly to downstream components 26 and whose output forms branch 30c.

For network 20, each of the branches 30 is connected to a corresponding splitter 32 which sends the associated data in an identical form to two locations, the first location being a side information network 34, as will be discussed further below, and the second location being a conditional probability model 36.

For network 24, the first two branches 30 (30a and 30b) provide their data directly to a corresponding conditional probability model 36 without diversion by a splitter. Branch 30c, however, provides its data to a splitter 32d sending the associated data in the identical form to two locations of a side information network 34d and a conditional probability model 36c.

This branching reduces the computational expense of making all data pass through all network components 26 and incurs insubstantial loss in quality.

It will be understood that the conditional probability models 36 receive values from both of the networks 20 and 24 during the training process and these values serve to refine the separate conditional probability models 36 on an iterative basis to build a conditional probability model that best matches the training set. The conditional probability models 36 may be initialized to an arbitrary conditional probability to aid in this convergence process, for example, a spherical Gaussian conditional probability with dimensions equal to dimensions of the data of the training set along the particular flow path 28.

As is understood in the art, a conditional probability will establish a probability distribution of an output value (values from network 24) based on a given input value (values from network 20).

The conditional probability models 36 will iteratively build a conditional probability model for the conditional probability of the training set data 12 by observing the values from the networks 20 and 24, for example, by a fitting process. For each given set of received data from the networks 20 and 24, however, an error value may be established between that existing model and that given set of received data. These error values will be propagated backward through the networks 20 and 24 to provide training of the weights of the network components 26 per standard network error propagation processes (sometimes termed back projection). In this way, both the conditional probability models 36 and the weights of the network components 26 are trained together.

This error value used for error propagation uses the current data points applied to a mapping of the current probability function, for example, an invertible mapping. The error value so deduced may be identical for the networks 20 and 24. The error value in the objective function comes from maximizing the log-likelihood of these conditional distributions, as typically understood in the art.

The conditional probability models 36 operate to steer the training process by allowing the imposition of a particular statistical family (e.g., Gaussian) on the conditional probability relationship. This is done, for example, by storing only moments (e.g., mean, variance) of the conditional probabilities essentially forcing them into a Gaussian model. In one embodiment only two moments are stored for each dimension of the conditional probability being mean and variance. Although the inventors do not wish to be bound by a particular theory, it is believed that this a priori imposition of a conditional probability model helps prevent averaging or mode collapse discussed above.

Referring still to FIG. 1, during the development of the conditional probabilities models 36, the weights of the networks 20 and 24 in the network components 26 may also be affected by the side information 18. In particular, the side information 18 may be provided at the outputs of the side information networks 34a-34d which use this side information 18 to create their own back-propagated errors which will be added to the errors from the conditional probability models 36 through the splitters 32 thus affecting the weights of the respective networks 20 and 26. Importantly, side information networks 34a and 34b include not only a standard classifier network 40 (attempting to classify the given input images 16a and 16b, respectively, with respect to the given side information 18) but also a gradient reversal layer 42. Gradient reversal layers 42 suitable for use with the present invention are described in Ganin, Y., Lempitsky, V., 2014 "Unsupervised domain adaptation by back projection", arXiv, preprint arXiv:1409.7495.

The effect of the gradient reversal layer 42 is to essentially remove any "learning" in the weights of network components 26 (associated with branches 30a and 30b) that is predictive of the side information 18. In this way, these network components receive training focused on the data that can be derived from the MRI images 16a uncorrelated with the side information 18.

This approach is switched with respect to branch 30c. The side information network 34c of this branch for both network 20 and network 24 does not have the gradient reversal layer 42. As a result the conditional probability models 36c provide a conditional probability dependent in part on the side information 18c.

During the training process of the conditional probability models 36, the training may be regularized to prevent trivial solutions such as mapping everything to zero by controlling the marginal distribution of the function or other similar techniques. In addition, additional side information 18 may be incorporated into the machine learning architecture 10 by adding additional branches 30 dedicated to that side information 18 (with side information networks 34 without gradient reversal layers 42) and adding comparable side information networks 34 with gradient reversal layers 42 on the remaining branches 30 following this approach.

Figure 2:
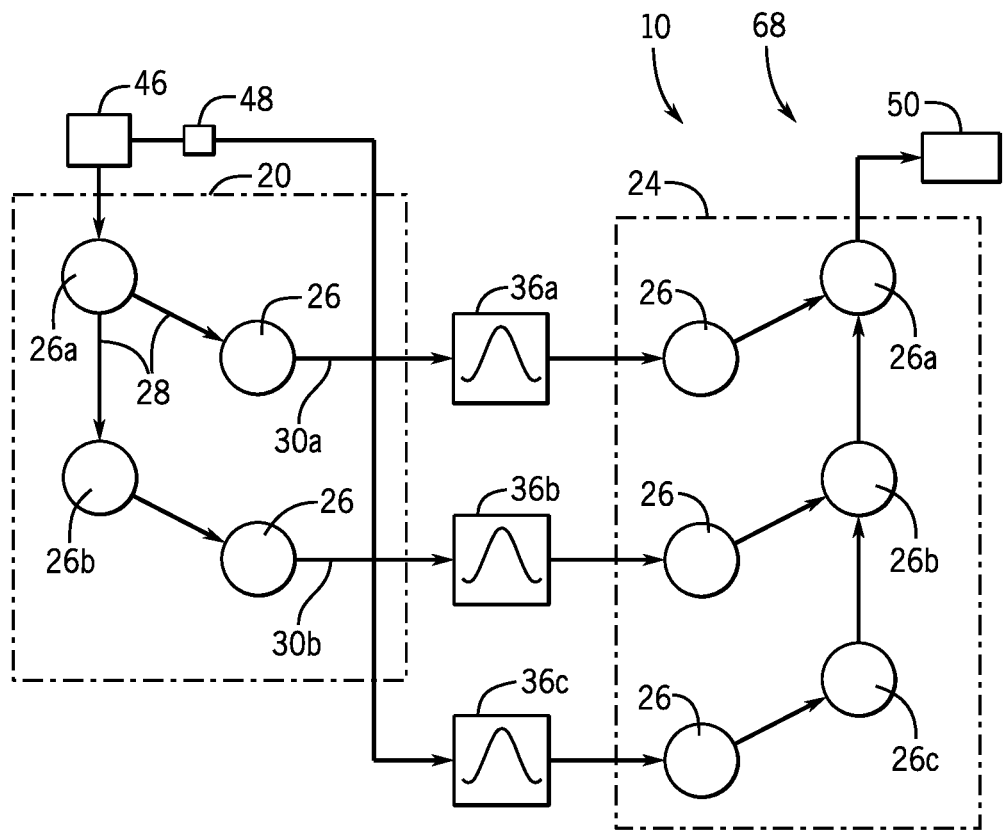
FIG. 2 is a block diagram similar to that of FIG. 1 of the machine learning architecture configured for use in modality transfer after training to convert MRI data to PET data.

Referring now to FIG. 2, after training, the machine learning architecture 10 may receive a given MRI image 46 and associated side information 18 for which there is no corresponding PET image. The MRI image 46 is provided to neural component 26*a* and the side information 18 is provided directly to the conditional probability model 36*c* instead of information from the final branch 30*c*. Effectively, neural component 26*c* and the remainder of branch 30*c* are eliminated together with the splitters 32 and the side information networks 34 which are used only for training.

Outputs from branches 30*a* and 30*b* of network 20 proceed as before to their respective conditional probability models 36*a* and 36*b*.

Data from branches 30*a* and 30*b* and the side information 18 input to the models 36 provide outputs from the models 36 in a sampling process that indexes a table describing the probability model to identify corresponding conditional probabilities and randomly selecting a value within the range of the identified conditional probabilities weighted according to those identified conditional probabilities. That is, output values of the sampling process tend to favor values associated with higher conditional probabilities.

These sample-driven values are then provided to network 24 where they pass "backward" through that network 24, being received by network components 26 associated with each branch 30, and then move upward through network components 26*a*-26*c*, respectively, combining at each flow path to ultimately produce an output value from network component 26*a* providing generated PET image 50. The combining follows the exact inverse of the splitting that was performed in the flow paths 28 of network 20 during the training. This generated PET image 50 will reflect the previous training of the networks 20 and 22 carried in the network weights and the values of the models in conditional probability models 36 captured in corresponding tables and the values of MRI image 16*a* and side information 18.

Figure 3:
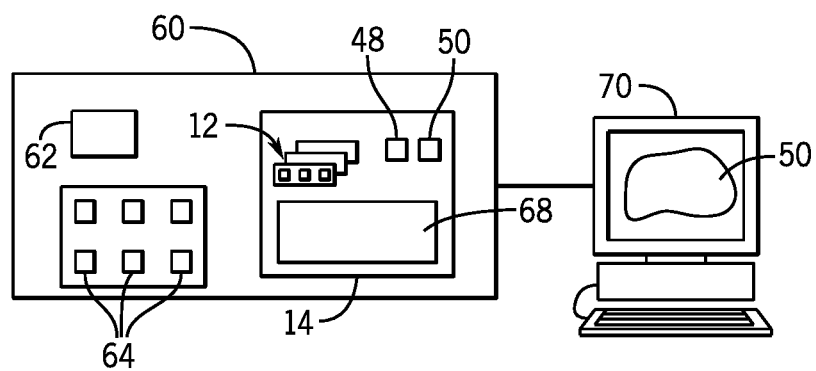
FIG. 3 is a block diagram of computer hardware providing for the implementation of the architectures of FIGS. 1 and 2.

Referring now to FIG. 3, the components of the machine learning network architecture 10 described above are demanding of computational resources and accordingly practically require the use of a special purpose computer 60 suitable for machine learning tasks. Such a computer 60 may include a general processor 62 (CPU) working in tandem with an array of special purpose processors 64 for implementing machine learning systems, for example, comprised of one or more GPUs (graphic processor units). The individual GPUs may execute Tensorflow, an open-source program that is widely distributed and supported by Alphabet, Inc., a California company that is the parent of Google.

These special purpose computers 60 may include memory 14 holding training set data 12 (images 16*a*, 16*b* and side information 18) as well as input MRI images 46 and side information 48 where a mode transfer is desired and the resulting generated PET image 50. This latter generated PET image 50 may be displayed on a diagnostic quality terminal 74 communicating with the computer 60 which may also provide for receipt of operator commands and the provision of other operator data.

The memory 14 may also include an operating program 68 implementing the blocks of FIGS. 1 and 2 as described above. Standard computer components such as network communication circuits and the like may be provided for the purpose of receiving and outputting data to and from the computer 60.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A computer architecture comprising:
a first machine learning network receiving input data and propagating the input data in a first flow direction through the first machine learning network according to first weight values to produce first output data at a first network interface;
a statistical variable converter receiving the first output data and applying it to a statistical model to provide second output data; and
a second machine learning network receiving the second output data at a second network interface and propagating the second output data in a second flow direction through the second machine learning network according to second weight values to provide output data;

wherein the first and second weights and the statistical model are trained values produced by:
(a) applying training set data to the first machine network to propagate in the first flow direction to the statistical variable converter; and
(b) applying corresponding training set data to the second machine network to propagate in a third flow direction opposite the second flow direction to the statistical variable converter;

wherein based on the propagation of the training set data, the statistical variable converter:
(a) modifies the statistical model; and
(b) provides error values for backpropagation to the first machine learning network and second machine learning network based on a current state of the statistical model.

2. The computer architecture of claim 1 wherein the statistical variable converter provides a predetermined statistical function and the modification of (a) modifies parameters of the predetermined statistical function.

3. The computer architecture of claim 2 wherein the statistical variable converter provides a conditional probability between the first output data and the second output data.

4. The computer architecture of claim 3 wherein the second output data is produced by randomly selecting a value on a conditional probability identified by the first output data according to the weighting of the conditional probability.

5. The computer architecture of claim 3 wherein the conditional probability function is stored as values of probability moments for a given distribution type.

6. The computer architecture of claim 5 wherein the probability moments are Gaussian mean and Gaussian variance.

7. The computer architecture of claim 1 wherein the first network provides a set of branches dividing data passing in the first flow direction in the first machine learning network among the branches to provide a first output for each branch at the first network interface, and wherein the statistical variable converter provides separate statistical models for each branch which provide separate second output data for each branch, and wherein the second network provides a set of branches combining data in the first third flow direction through the second machine learning network to produce the output data combining the separate second output data.

8. The computer architecture of claim 7 wherein the first machine learning network further includes a given statistical variable converter not associated with a branch of the first machine learning network but associated with the branch of the second machine learning network, and wherein the given statistical variable converter receives side information related to the input data;

and wherein the given statistical converter uses a statistical model that is trained by training the first machine learning network and second machine learning network also with respect to side information but isolating side information-based weighting to only a given branch of the first machine learning network associated with the given statistical variable converter.

9. The computer architecture of claim 8 wherein the process of isolation uses side information machine learning networks on branches of the first machine learning network other than the given branch having gradient reversal layers, the side information machine learning networks receiving the side information and operating in parallel with the statistical variable converters during training.

10. The computer architecture of claim 9 wherein the process of isolation uses side information machine learning on the given branch of the first machine learning network and second machine learning network during training without gradient reversal layers.

11. The computer architecture of claim 8 wherein the training set data includes corresponding MRI images and PET images of given patients and wherein the input data is an MRI image of a patient output data that is a simulated PET image of the patient.

12. The computer architecture of claim 11 wherein the training set data further includes side information associated with the patient selected from the group consisting of age and gender.

* * * * *